(12) United States Patent
Kawamoto

(10) Patent No.: US 6,361,439 B1
(45) Date of Patent: Mar. 26, 2002

(54) GAME MACHINE AUDIO DEVICE AND INFORMATION RECORDING MEDIUM

(75) Inventor: Yoshinori Kawamoto, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/483,867

(22) Filed: Jan. 18, 2000

(30) Foreign Application Priority Data

Jan. 21, 1999 (JP) .......................................... 11-013434

(51) Int. Cl.⁷ .............................................. H63F 13/00
(52) U.S. Cl. .......................................... 463/35; 381/17
(58) Field of Search ...................... 463/30, 35; 381/17, 381/61, 1; 309/174, 175

(56) References Cited

U.S. PATENT DOCUMENTS

| | | | | |
|---|---|---|---|---|
| 4,314,236 A | * | 2/1982 | Mayer et al. ............... | 340/384 |
| 5,026,051 A | * | 6/1991 | Lowe et al. ................ | 273/435 |
| 5,754,660 A | * | 5/1998 | Shimizu ...................... | 381/17 |
| 5,768,393 A | * | 6/1998 | Mukojima et al. ............ | 381/17 |
| 5,862,229 A | * | 1/1999 | Shimizu ...................... | 381/17 |
| 5,946,400 A | * | 8/1999 | Matssuo ...................... | 381/17 |
| 6,078,669 A | * | 6/2000 | Maher ......................... | 381/17 |

OTHER PUBLICATIONS

Metro Manila, Creative launches Sound Blaster Live! ,Aug. 20, 1998, Computerworld Phillipines.*
Rich Warwick, Avoiding a direct sound3D disaster, Jan. 98, Game Developer.*
J.C. Herz, Holding the Reins of Reality, Jun. 25, 1998; New York Times.*

* cited by examiner

Primary Examiner—Jessica J. Harrison
Assistant Examiner—John M Hotaling, II
(74) Attorney, Agent, or Firm—Faegre & Benson LLP (57) ABSTRACT

A game machine audio device is provided which can obtain sounds to which a sense of distance in virtual game space has been imparted, while hardly altering the sound volume.

Frequency components in sounds generated are altered according to distances in virtual game space between the sound emission position and the listening position.

3 Claims, 9 Drawing Sheets

| ADDRESS 0 | SOUND EFFECTS AUDIO DATA A (DISTANCE 00m TO 09m) |
|---|---|
| ADDRESS 1 | SOUND EFFECTS AUDIO DATA B (DISTANCE 10m TO 19m) |
| ADDRESS 2 | SOUND EFFECTS AUDIO DATA C (DISTANCE 20m TO 29m) |
| ADDRESS 3 | SOUND EFFECTS AUDIO DATA D (DISTANCE 30m TO 39m) |
| ADDRESS 4 | SOUND EFFECTS AUDIO DATA E (DISTANCE 40m TO 49m) |

| ADDRESS 0 | SOUND EFFECTS AUDIO DATA A (DISTANCE 00m TO 09m) |
|---|---|
| ADDRESS 1 | SOUND EFFECTS AUDIO DATA B (DISTANCE 10m TO 19m) |
| ADDRESS 2 | SOUND EFFECTS AUDIO DATA C (DISTANCE 20m TO 29m) |
| ADDRESS 3 | SOUND EFFECTS AUDIO DATA D (DISTANCE 30m TO 39m) |
| ADDRESS 4 | SOUND EFFECTS AUDIO DATA E (DISTANCE 40m TO 49m) |

GAME MACHINE AUDIO DEVICE AND INFORMATION RECORDING MEDIUM

BACKGROUND OF THE INVENTION

1. Field of the Invention

This invention relates to an audio unit for use in a game machine and to an information recording medium that can be used in such a device.

2. Description of the Related Art

In game machines, sound effects and other audio constitute an extremely important part of the configuration. The role of audio is first to give the game player a sense of realism. Such audio produces a synergistic effect with the video images, etc., according to each scene. Audio is also used extensively to inform the player that the game has started or ended, or that game points have been scored.

Another important role of sound effects and other audio, when they can be heard by people other than the actual game players, is to promote interest in the game. This is especially important for commercially operated game machines. In such game machines, when the machine is running idly with no one playing it, a demonstration is carried on which displays highlights of the game. The sounds generated at this time can create interest in the game in potential players. Audio thus occupies a position of extreme importance.

Conventionally, such audio, for which stereo sound is primarily used, is controlled so as to change the volume balance between speakers deployed on the left and right sides relative to the players, corresponding respectively to sounds that should be generated to the left and right in the virtual game space. Control is also effected in the near-far dimension by altering the sound volume itself. Sound becomes smaller the greater the distance from the sound origin to the listener becomes. Sound volume control is thus implemented in game machines also in accordance with this natural principle. By means of such control, a sense of distance can be produced by the sound effects.

There is a problem with controlling the sound volume according to near-far distances in virtual game space, however. When sound effects are generated with images involving a distant explosion, the sound volume becomes small and impact is lacking. When the game machine is in demonstration mode, in particular, the generation of sound effects having no force of impact will not be very effective in promoting interest in playing the game.

An object of the present invention is to provide a game machine audio device wherewith sound can be obtained which imparts a sense of distance in virtual game space without changing the sound volume much at all, thus resolving the problems with the prior art described in the foregoing.

SUMMARY OF THE INVENTION

In order to achieve the object noted above, the present invention is a game machine audio device wherein the frequency components of generated sounds are altered according to the distance between the sound generation position and listening position in virtual game space.

It is efficacious to alter the frequency components in audio coming over different distances in virtual game space. As sounds are generated from greater and greater distances in virtual game space, it is effective to attenuate the high portions of the frequency components thereof while amplifying the low portions of the frequency components thereof.

It is desirable that changes in frequency components of sound be processed using a digital signal processor.

In order to achieve the object stated earlier, moreover, an information recording medium wherein information relating to the game is stored can be used in the device described in the foregoing in such manner as to contain information for finding distances from sound generation positions to listening positions in virtual game space and information for altering the frequency components of generated sounds based on the distances so found.

DESCRIPTION OF THE PREFERRED EMBODIMENTS

Embodiment aspects of the present invention are now described with reference to the attached drawings.

A simple description of the present invention is first given for one example of a game machine. This game is a shooting game wherein the player seeks to shoot targets that appear at all distances in the virtual game space. Sounds from the targets themselves as well as target explosion sounds when the players shot hits the target are emitted as sound effects audio from speakers provided in the main game unit.

Figure 1:
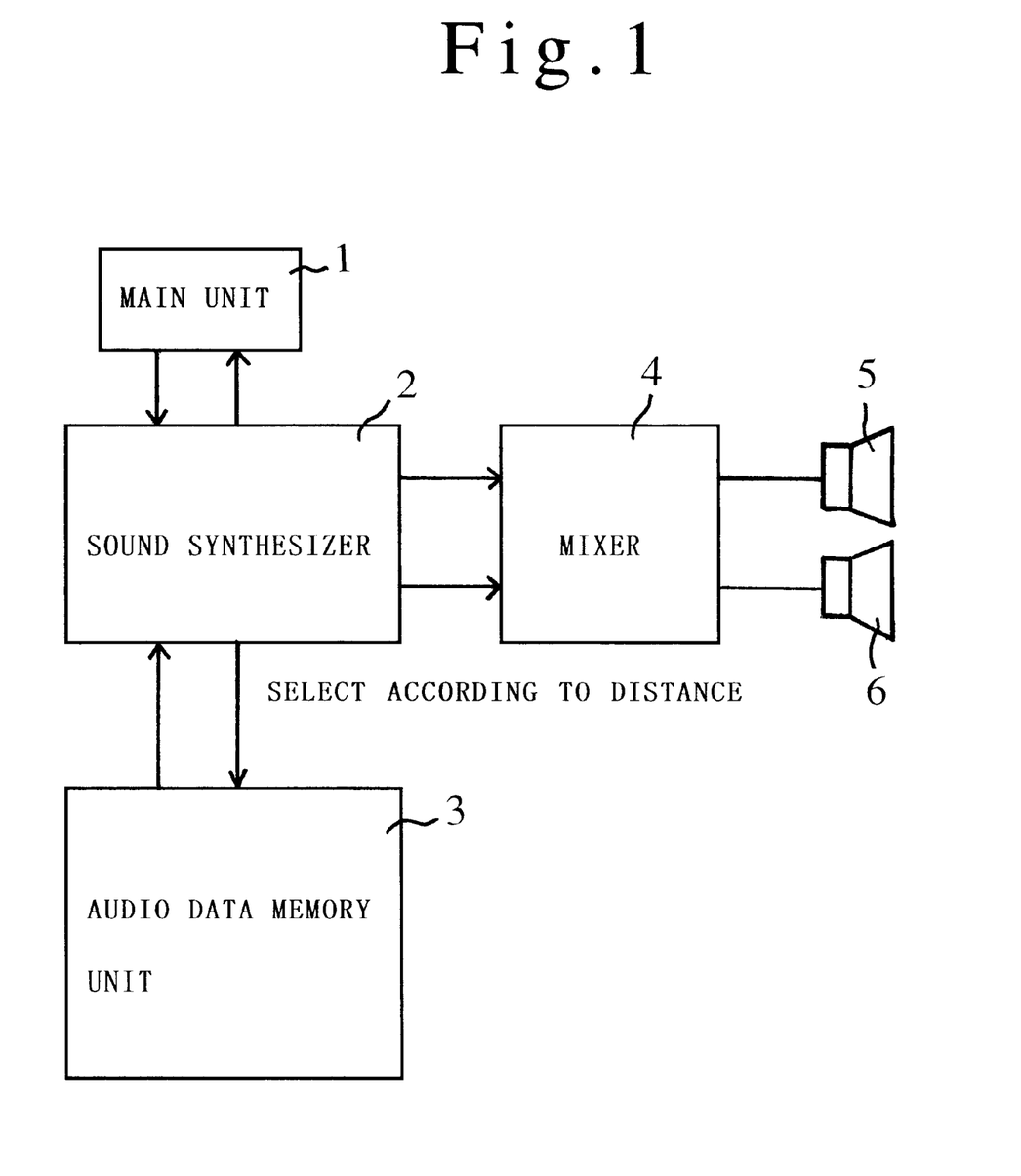
FIG. 1 is a control block diagram representing one embodiment aspect of the present invention.
Figure 2:
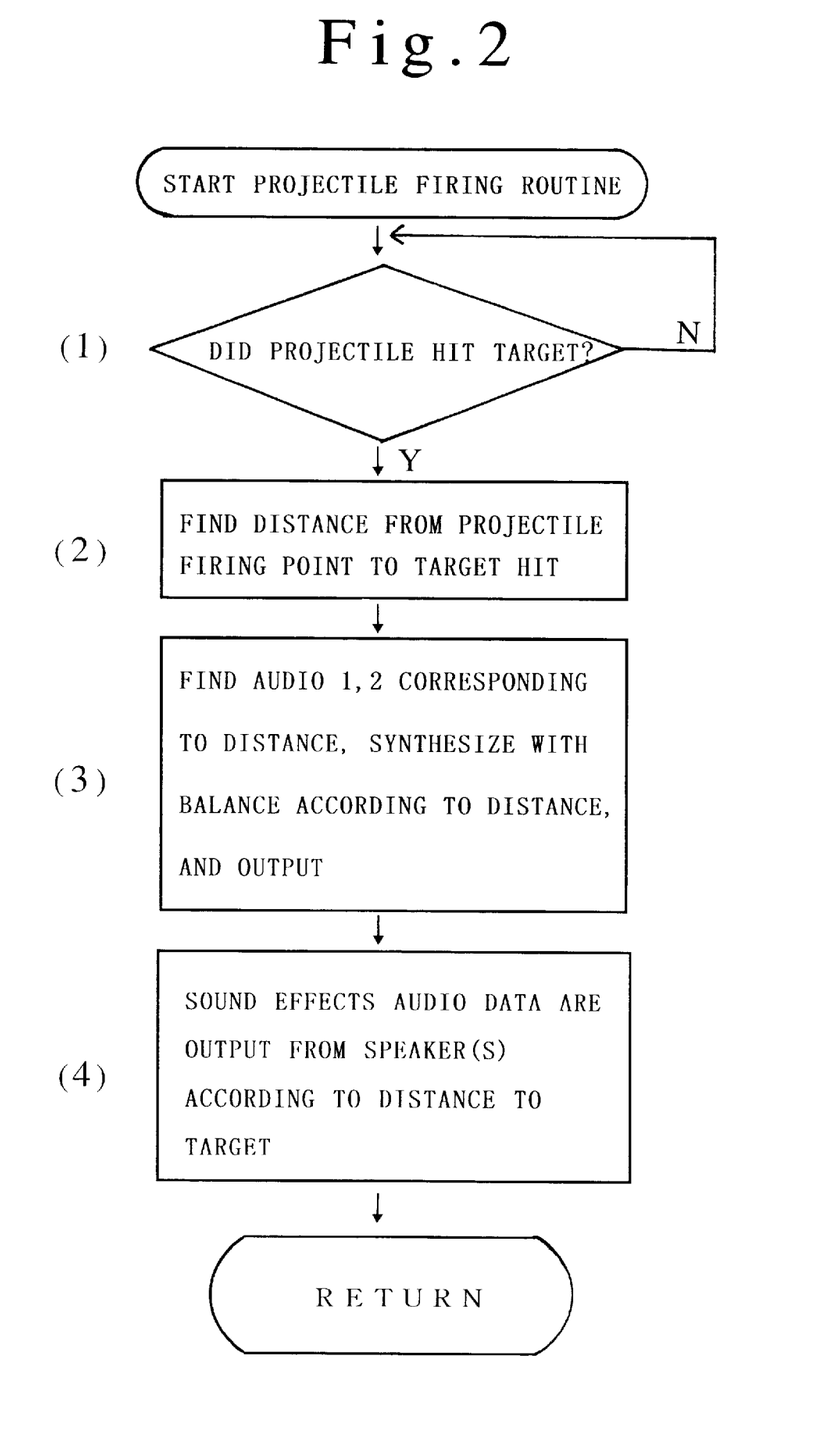
FIG. 2 is a flowchart of an example control flow therein.

In FIG. 1, item 1 is a main controller, 2 is a sound synthesizer, 3 is an audio data memory unit, and 4 is a mixer for regulating the sound effects audio sounded from left and right speakers 5 and 6. The main controller 1 controls the game. FIG. 2 is a flowchart representing a portion of that control.

Figure 3:
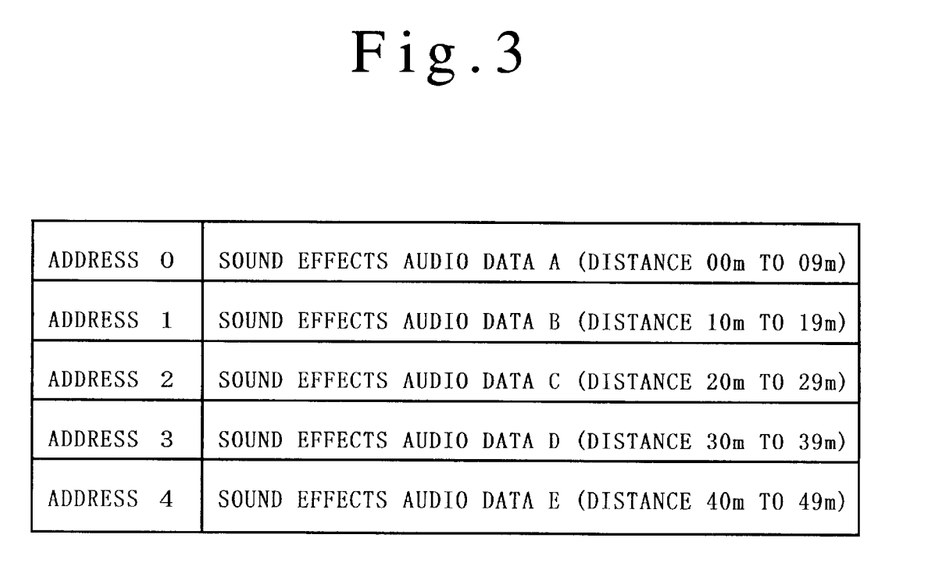
FIG. 3 is a diagram of sound effects audio patterns.

In FIG. 2, when the projectile firing routine is started, a judgment is made as to whether or not the projectile hit a target (step 1). When the projectile has hit a target, the distance from the listening position at the projectile firing location in the virtual game space to the sounding position at the target that was hit is found (step 2). In the controller, as diagrammed in FIG. 3, patterns for sound effects audio data 0 to 4 are provided beforehand for each sector in the virtual game space divided according to distance. Hence, when the distance of the exploding target has been found, the table corresponding to that distance is referenced, and audio having the audio pattern corresponding to that distance is output (step 3). Sound effects audio based on that sound effects audio pattern is then output from the speakers 5 and 6 (step 4).

Figure 9:
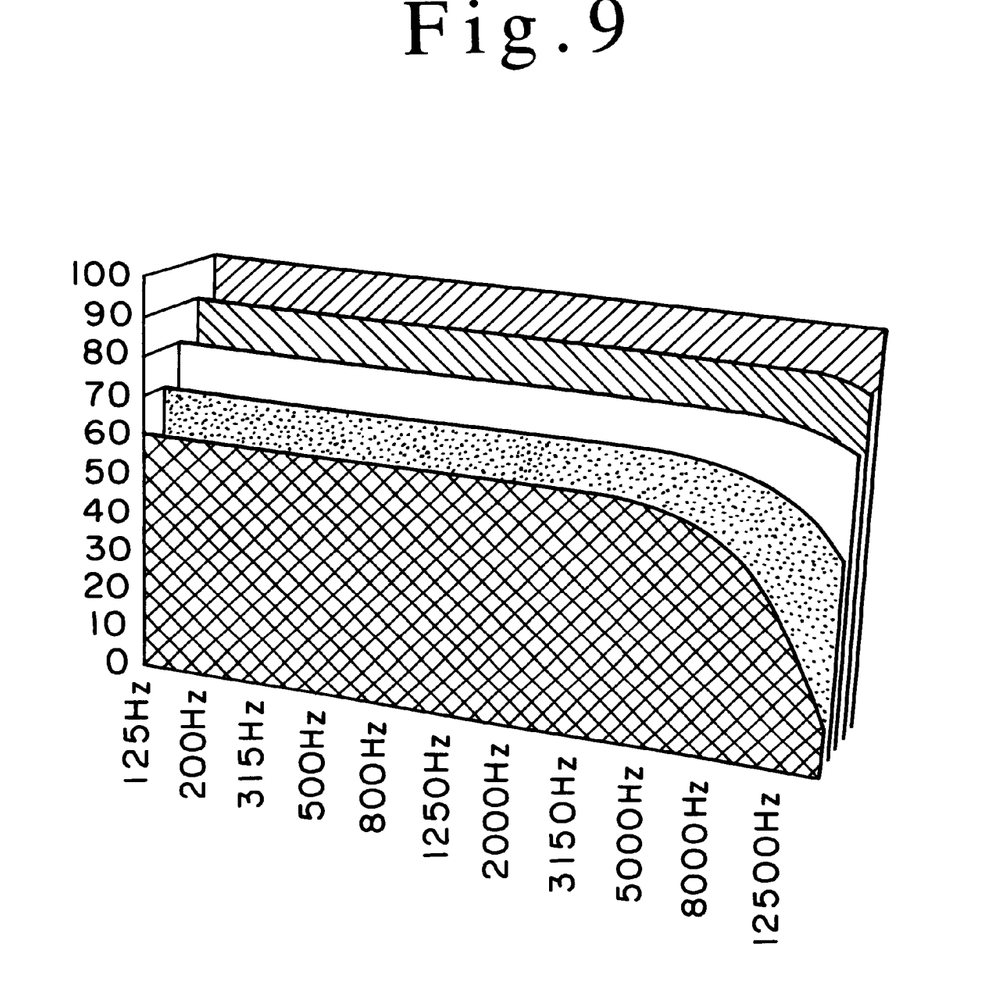
FIG. 9 is a diagram for describing frequency changes in audio patterns for conventional sound effects audio.

Such control is also performed in conventional game machines. In the conventional cases, however, the sound effects audio data in step 3 are data that have been changed to lower the sound volume according to the distance, as indicated in FIG. 9. Accordingly, the sound volume for explosion sounds of distant targets in the virtual game space is lowered, wherefore the sound pressure also falls, resulting in the problem of lost impact described earlier.

Figure 4:
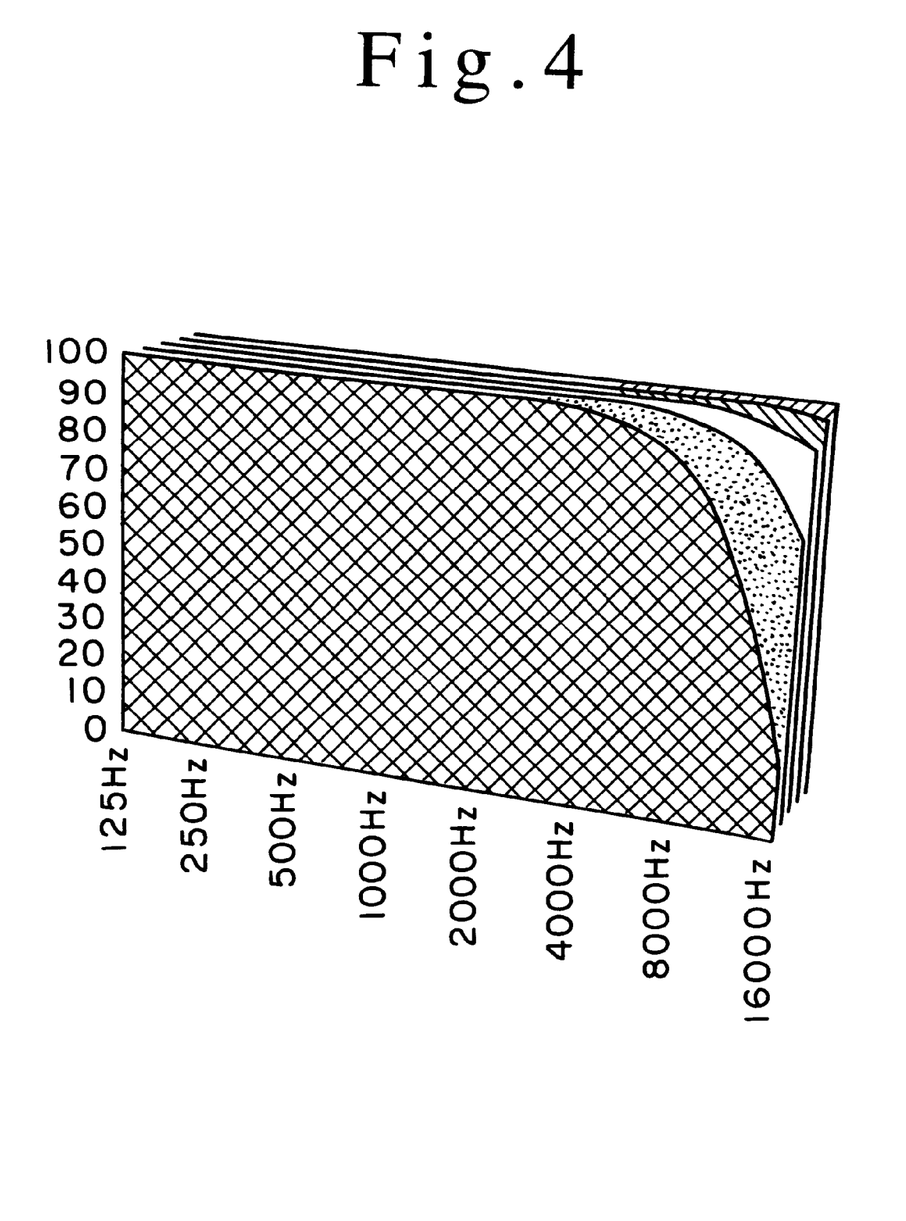
FIG. 4 is a diagram for describing frequency changes in audio patterns for sound effects audio in the present invention.

That being so, with the present invention, the sound effects audio data are changed in terms of the frequency components therein but not in terms of volume, as diagrammed in FIG. 4. More specifically, the portion of the sound having high frequency is attenuated according to the distance. This uses the phenomenon whereby the frequency changes according to the medium wherein the sound is propagated. In the natural world, in the air that we always have at our ears and are sensibly accustomed to, those portions of sound having high frequency components are gradually attenuated as the sound origin becomes more distant. That is the phenomenon that is employed here. Accordingly, the volume of the sound effects is not changed, wherefore a sense of distance can be effected without losing the powerful impact of the sound. Furthermore, in practice, if measures are implemented to impart a sense of distance to sounds by attenuating those portions having high frequency components, the impact thereof will not be impaired even if the volume is somewhat altered according to the distance, so there is no problem whatever in slightly altering the volume according to distance. In the embodiment aspect described in the foregoing, moreover, the high-frequency portions of sounds are attenuated without altering the volume, but a sense of distance can also be imparted without losing the forceful impact of the sounds by amplifying the low-frequency portions of the sounds.

Figure 5:
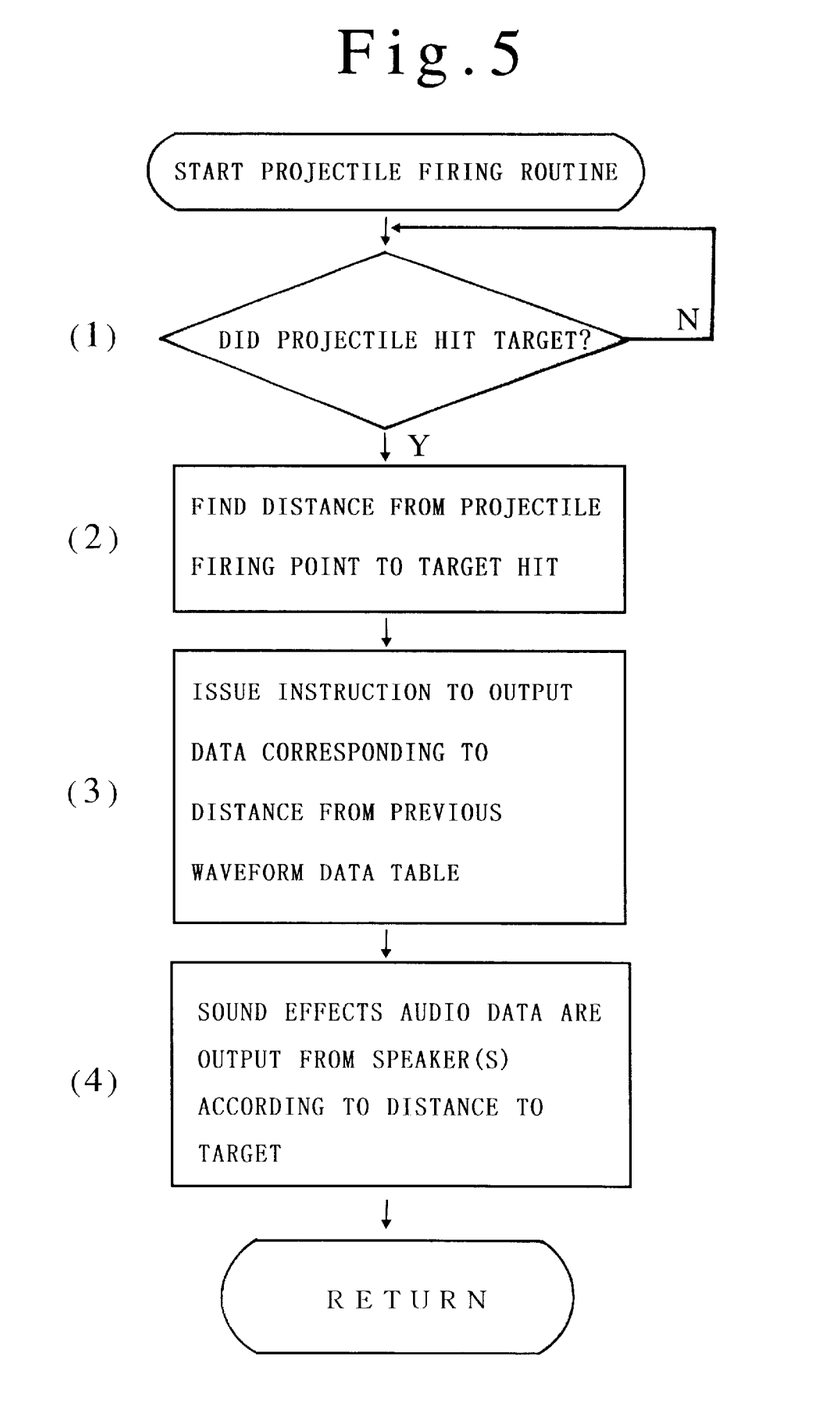
FIG. 5 is a flowchart for an example modification of FIG. 2.

FIG. 5 represents an example modification of the embodiment aspect diagrammed in FIG. 2, wherein only step 3 differs. That is, in step 3 in FIG. 2, sound effects data are provided beforehand for each of the sectors into which the virtual game space is divided according to distance, wherefore, if within the same sector, sound will be emitted wherein the portions having high frequency components have been attenuated in the same way even if the distance thereof in virtual game space is somewhat different.

Figure 6:
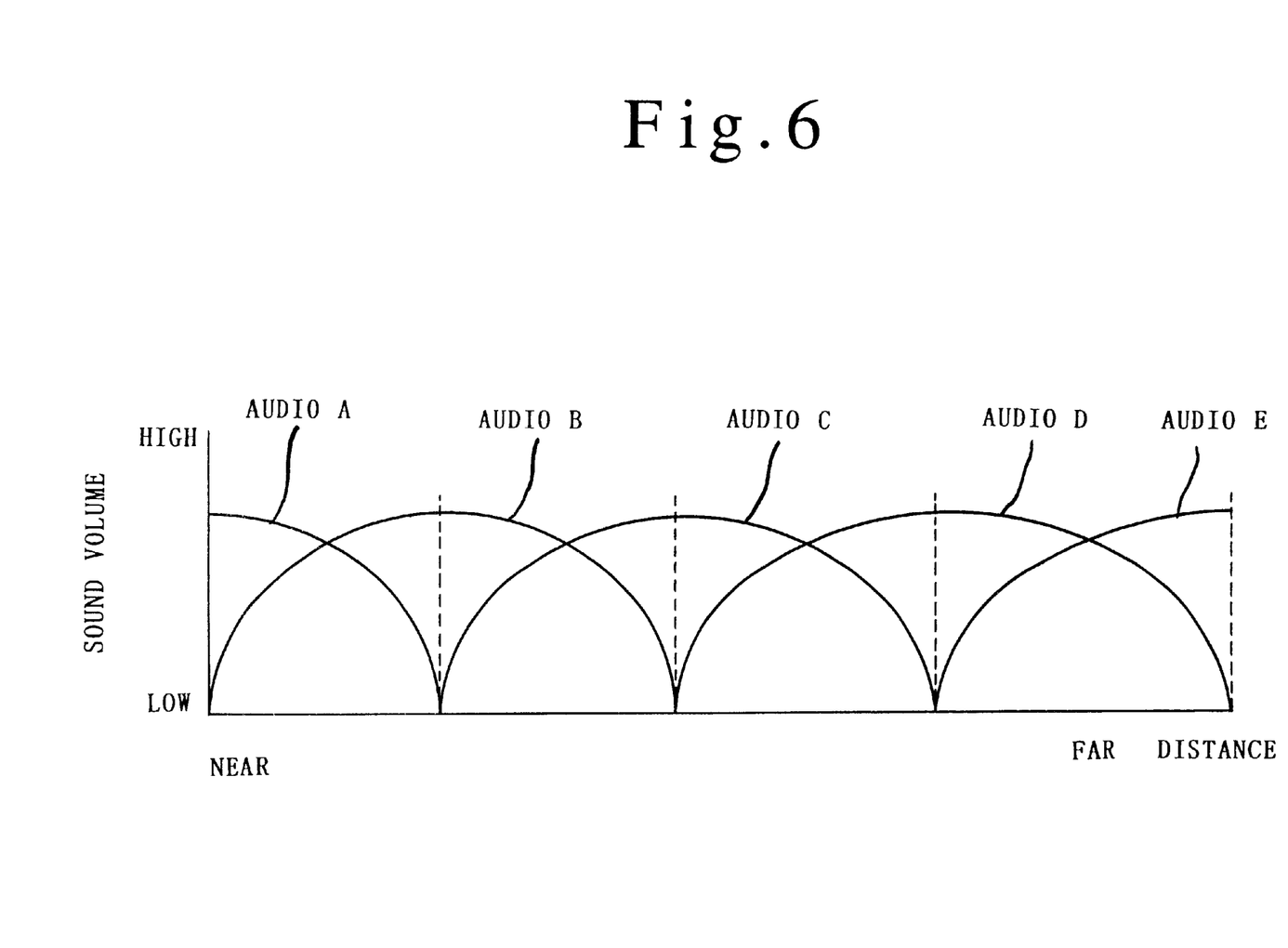
FIG. 6 is a graph representing a sound effects audio pattern.

In this example, however, as diagrammed in the graph given in FIG. 6, when sound effects patterns 0 to 4 have been provided beforehand, audio patterns adjacent to the sound effects audio pattern at that distance are cross-faded and output.

If configured in this way, the sound effects emitted at all distances in the virtual game space can be changed in a non-stepwise fashion, wherefore finely controlled sound effects audio can be output. In this configuration, moreover, as described earlier, the portions of sounds having high frequency components can be attenuated according to distance without altering the volume thereof, so a sense of distance can be imparted to the sound effects audio without losing the powerful impact of the sound.

Figure 7:
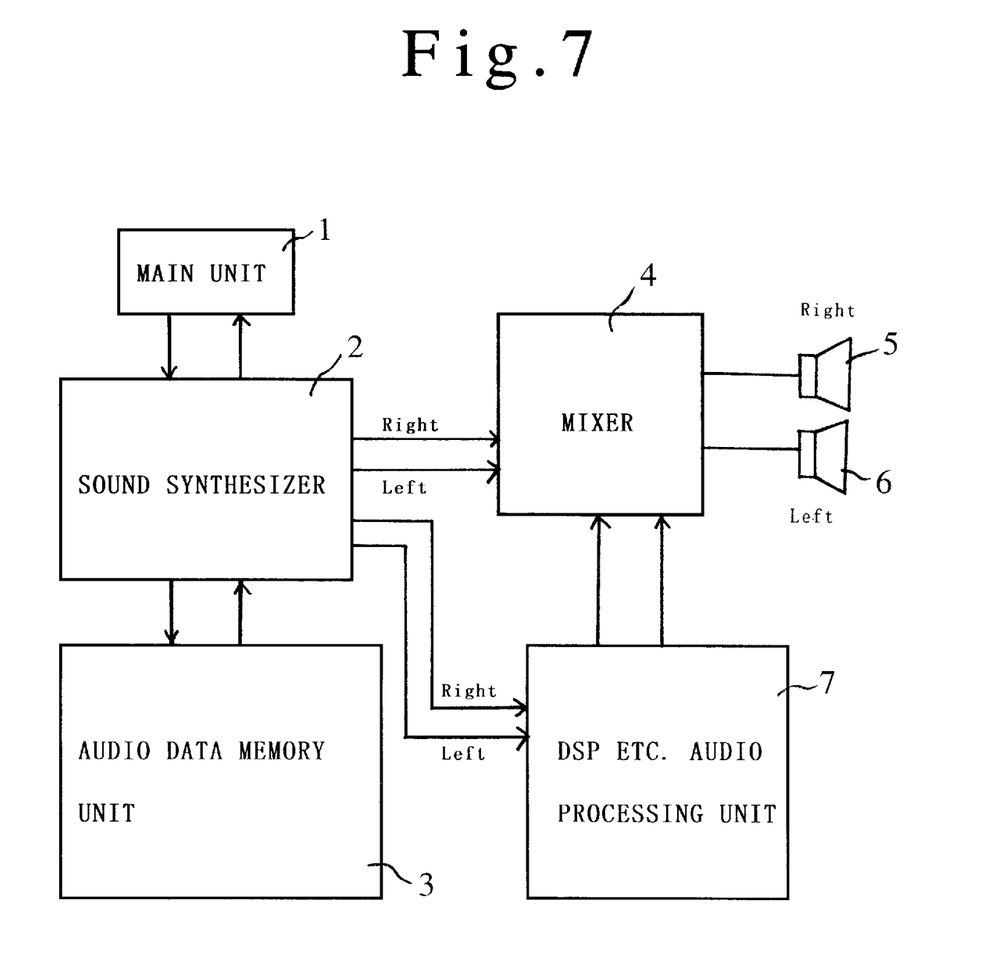
FIG. 7 is a control block diagram representing another embodiment aspect of the present invention.

FIG. 7 differs from FIG. 1 in that a DSP (digital signal processor) audio processing unit 7 is provided for processing the output audio. An equalizer capable of altering frequency characteristics is programmed in the DSP.

Figure 8:
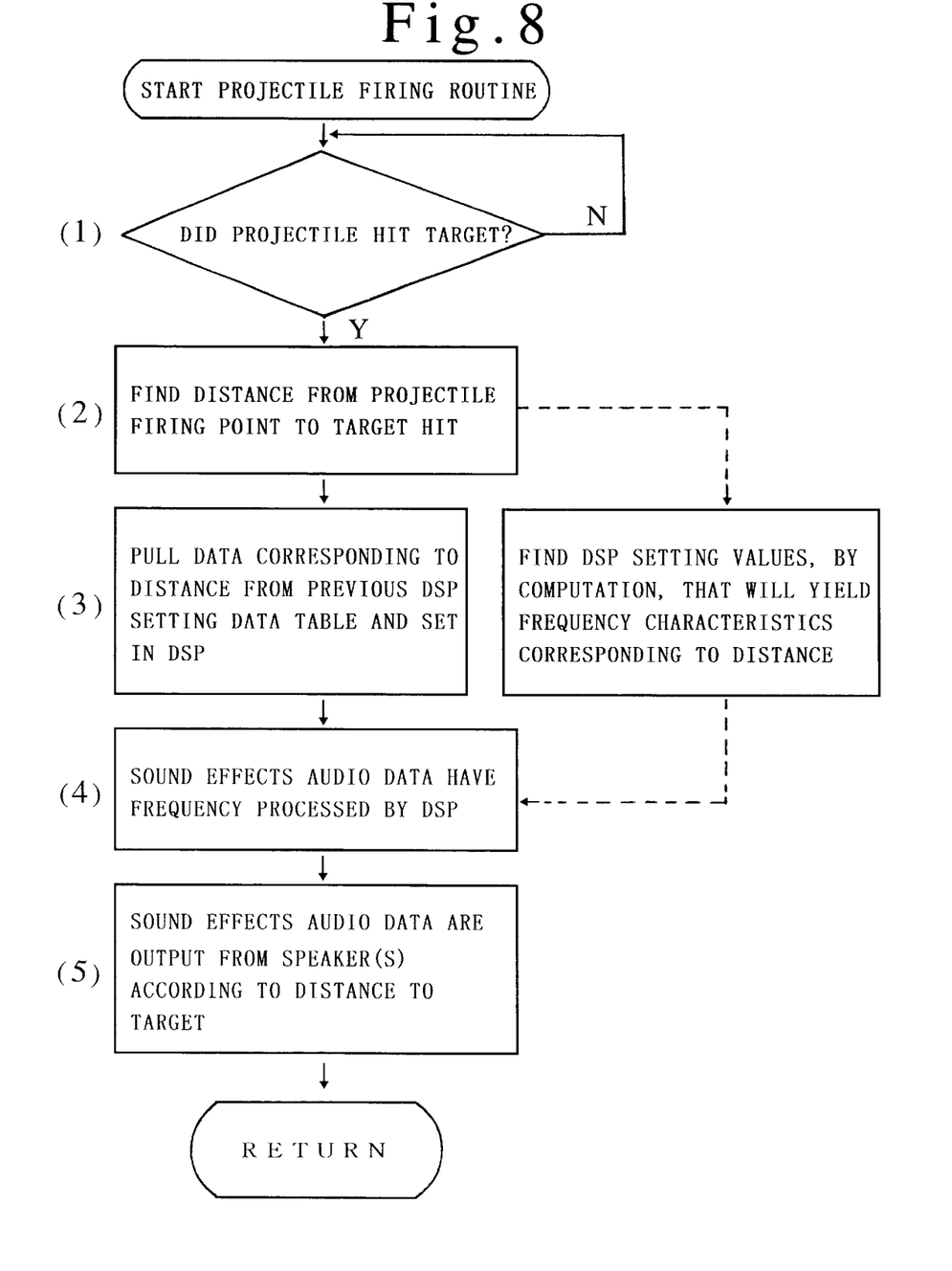
FIG. 8 is a flowchart of one example of the control flow in FIG. 7.

In FIG. 8, when the projectile firing routine is started, a judgment is made as to whether or not the projectile hit a target (step 1). When the projectile has hit a target, the distance from the projectile firing location in the virtual game space to the target that was hit is found (step 2). When the distance to the exploding target has been found, the DSP is set so that the high-frequency portions fall within the attenuated-curve region of the high region according to the distance (step 3). With setting patterns according to distance prepared beforehand, this pulls data out from that data table corresponding to the distance and sets them in the DSP. Next, the sound effects audio data are processed by the DSP so that the sound portions having high frequency components are attenuated without altering the sound volume (step 4), and the processed sound effects audio is output from the speakers 5 and 6 (step 5).

If configured in this manner, the original sound effects (identical at every distance) output from the sound circuit are output after being processed by the DSP prior to being output from the speakers, wherefore a sense of distance can be created by audio. As in the embodiment aspect described earlier, moreover, the volume of the sound effects audio data is hardly changed at all, wherefore sound effects that are at a distance in the virtual game space can be effected so that they retain a powerful impact.

In step 3 in the embodiment aspect diagrammed in FIG. 8, described earlier, a formula may be established to produce characteristics such that sound portions having high-frequency components are attenuated according to distance, and the distance substituted in that formula to derive the values set in the DSP. In that case, the formula could impart variations depending on the game specifications.

The embodiment aspects described in the foregoing relate to audio devices used in game machines, but the present invention can also be applied to information storage media such as CD-ROMs wherein game programs are recorded. More specifically, such information storage media would contain information for finding distances from sound emission positions to listening positions in virtual game space, together with information for altering the frequency components of the sounds generated, based on the distances found thereby.

If configured in that manner, it would be possible even in games that use information storage media to attenuate sound portions having high-frequency components, according to the distance, without altering the volume of the sound, and thus to impart a sense of distance to the sound effects audio without losing powerful sound impact.

As based on the configuration of the present invention, a sense of distance can be imparted to sound effects audio without losing the powerful impact of the sound effects audio.

What is claimed is:

1. A game machine audio device characterized in that a frequency component of a generated sound is altered according to distance in virtual game space from sound emission position to listening position wherein low frequency components of the generated sound are increasingly amplified as the sound emission position becomes more distant from the listening position in the virtual game space.

2. The game audio device according to claim 1, wherein alterations of frequency components in sounds are processed using a digital signal processor.

3. An information storage medium storing game-related information comprising:
   information for finding distances in virtual game space between sound emission positions and listening positions; and
   information for altering frequency components of sounds generated, based on distances so found wherein low frequency components of the generated sound are increasingly amplified as the sound emission positions become more distant from the listening positions in the virtual game space.

* * * * *

UNITED STATES PATENT AND TRADEMARK OFFICE
CERTIFICATE OF CORRECTION

PATENT NO. : 6,361,439 B1
DATED : March 26, 2002
INVENTOR(S) : Kawamoto

It is certified that error appears in the above-identified patent and that said Letters Patent is hereby corrected as shown below:

<u>Column 4,</u>
Line 56, after "information", please insert -- ; --.

Signed and Sealed this

Twelfth Day of November, 2002

Attest:

Attesting Officer

JAMES E. ROGAN
Director of the United States Patent and Trademark Office